(12) United States Patent
Kimata et al.

(10) Patent No.: US 11,613,470 B2
(45) Date of Patent: Mar. 28, 2023

(54) SIC POWDER AND METHOD FOR MANUFACTURING SAME, ELECTRICALLY HEATED HONEYCOMB STRUCTURE AND METHOD FOR MANUFACTURING SAME

(71) Applicant: NGK INSULATORS, LTD., Nagoya (JP)

(72) Inventors: Takafumi Kimata, Nagoya (JP); Soichiro Aoyagi, Nagoya (JP); Kisuke Yamamoto, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 345 days.

(21) Appl. No.: 16/885,654

(22) Filed: May 28, 2020

(65) Prior Publication Data

US 2020/0385275 A1 Dec. 10, 2020

(30) Foreign Application Priority Data

Jun. 6, 2019 (WO) .................. PCT/JP2019/022634
Apr. 8, 2020 (JP) ............................. JP2020-069912
May 22, 2020 (JP) ............................. JP2020-089973

(51) Int. Cl.
*C01B 32/956* (2017.01)
*C04B 35/565* (2006.01)
*C04B 111/00* (2006.01)

(52) U.S. Cl.
CPC .......... *C01B 32/956* (2017.08); *C04B 35/565* (2013.01); *C01P 2004/51* (2013.01); *C01P 2006/16* (2013.01); *C04B 2111/00224* (2013.01)

(58) Field of Classification Search
CPC ... C01B 32/956; C01B 32/984; C04B 35/565; C04B 2111/00224; C04B 2111/00793; C04B 2111/0081; C04B 2235/3481; C04B 2235/3834; C04B 2235/3891; C04B 2235/40; C04B 2235/404; C04B 2235/405; C04B 2235/407; C04B 2235/42; C04B 2235/424; C04B 2235/428; C04B 2235/5436; C04B 2235/5463; C04B 2235/549; C04B 2235/6567; C04B 2235/658; C04B 2235/663; C04B 2235/723; C04B 2235/725;

(Continued)

(56) References Cited

U.S. PATENT DOCUMENTS

2012/0187109 A1* 7/2012 Noguchi .................. B01J 35/04
                                                              219/553
2014/0294692 A1 10/2014 Kikuchi et al.
2019/0109507 A1 4/2019 Umemoto et al.

FOREIGN PATENT DOCUMENTS

| JP | 2014-198320 A1 | 10/2014 |
| JP | 2017-188492 A1 | 10/2017 |
| WO | 2017/183223 A1 | 10/2017 |

OTHER PUBLICATIONS

Wei, Beta SiC Powders Produced by Carbothermic Reduction for Silica in a High-Temperature Rotary Furnace, Communications of the American Ceramic Society 1983; 66(7): C-111 to C-113 (Year: 1983).*

(Continued)

*Primary Examiner* — Daniel C. McCracken
(74) *Attorney, Agent, or Firm* — Burr Patent Law, PLLC (57) ABSTRACT

A SiC powder containing 70% by mass or more of a β-SiC, wherein in a volume-based cumulative particle size distribution measured by a laser diffraction method, a D50 is 8 to 35 μm and a D10 is 5 μm or more.

19 Claims, 1 Drawing Sheet

(58) Field of Classification Search
CPC .......... C04B 2235/727; C04B 2235/80; C04B 35/573; C04B 35/6365; C04B 35/64; C04B 38/0012; C04B 35/622; C04B 35/6265; C04B 2235/3206; C04B 2235/402; C04B 2235/656; C04B 2235/6583; C04B 2235/661; C04B 2235/75; C01P 2004/51; C01P 2006/16; B01D 46/2418; B01J 27/224; B01J 35/04; F01N 3/2828; H05B 3/148
See application file for complete search history.

(56) References Cited

OTHER PUBLICATIONS

Backhaus-Ricoult, et al., Impurities in silicon carbide ceramics and their role during high temperature creep, J. Phys. III France 1993 ; 3: 2189-2210 (Year: 1993).*

Klinger, et al., Reactions Between Silica and Graphite, J. Am. Ceram. Soc. 1966; 49(7): 369-375 (Year: 1966).*

English translation of the International Preliminary Report on Patentability (Chapter I) dated Dec. 16, 2021 (Application No. PCT/JP2019/022634).

"*Investigation of the Molten Salt Process for Shaping of Silicon Carbide Powder*," Lignus Chardonnet, "Chinese Degree Paper Full Database" (Jun. 27, 2018) pp. 25, 26, 27, 32, 33, 34.

Chinese Office Action (with English translation) dated May 31, 2022 (Application No. 202010472737.9).

International Search Report (Application No. PCT/JP2019/022634) dated Jul. 16, 2019.

Lei Guo, et al., "Study Progress of Silicon Carbide Non-Linear Property," *Insulating Materials*, China Academic Journal Electronic Publishing House, Jun. 30, 2005, Issue 3, pp. 60-64.

Chinese Office Action (Application No. 202010472737.9) dated Dec. 20, 2021 (with English translation).

* cited by examiner

SIC POWDER AND METHOD FOR MANUFACTURING SAME, ELECTRICALLY HEATED HONEYCOMB STRUCTURE AND METHOD FOR MANUFACTURING SAME

FIELD OF THE INVENTION

The present invention relates to a SiC powder and a method for manufacturing the same. The present invention also relates to a honeycomb structure that can function as a heater by applying a voltage, and a method for manufacturing the same.

BACKGROUND OF THE INVENTION

Conventionally, a honeycomb structure made of ceramics has been used as a base material of an electrically heated catalyst (EHC) for purifying exhaust gas, a ceramic heater, and the like. Such an application involves an operation of connecting metal terminals to a pair of electrode portions of the honeycomb structure and applying a voltage to heat the honeycomb structure. For example, an EHC is an exhaust gas purification device that is provided in an exhaust gas path of an automobile or the like and purifies exhaust gas discharged from an engine. The EHC supports a catalyst, and by heating the EHC, the catalyst is heated to a temperature required for activation.

Conventionally, a technique that focuses on the electrical resistivity of electrode portions in order to improve the uniformity of a current flowing through an EHC is known. Japanese Patent Application Publication No. 2014-198320 (Patent Literature 1), proposes that the electrode portions are made of a porous body in which particles made of silicon carbide as an aggregate are bonded by a binder, and the silicon carbide as the aggregate constituting the electrode portions comprises a β-SiC having a stacking fault of 2% or less, and that the binder constituting the electrode portions comprises silicon and metal silicide. Patent Literature 1 describes that with this configuration the electrical resistivity of electrode portions can be lower than that of a conventional honeycomb structure. Further, it describes that as a result the current supplied to one of the pair of electrode portions is well transmitted to the entire area of the electrode portion, and the current flows uniformly from the electrode portion to the entire honeycomb structure.

Further, paragraph 0047 of Patent Literature 1 describes that, "the average particle diameter of the particles made of silicon carbide as the aggregate is preferably 10 to 70 μm, more preferably 10 to 50 μm, and particularly preferably 15 to 40 μm. If the average particle diameter of the particles made of silicon carbide contained in the electrode portion is less than 10 μm, the electrical resistivity of the electrode portion tends to increase. In addition, when the average particle diameter of the particles made of silicon carbide contained in the electrode portion is more than 70 μm, the strength of the electrode portion tends to decrease".

CITATION LIST

Patent Literature

[Patent Literature 1] Japanese Patent Application Publication No. 2014-198320

SUMMARY OF THE INVENTION

Patent Literature 1 discloses a technical idea of lowering the electrical resistivity of the electrode portions in order to allow a current to uniformly flow through the entire honeycomb structure. Further, in order to reduce the electrical resistivity of the electrode portions, it specifically proposes that β-sic having a stacking fault of 2% or less is used as an aggregate constituting the electrode portions, and the average particle diameter of the aggregate particles is controlled to 10 to 70 μm.

However, Patent Literature 1 lacks consideration of the change in the electrical resistivity over time, and even if a low electrical resistivity is initially obtained, there has been a concern that the electrical resistivity will increase when used for a long time. According to the study results of the present inventors, it has been found that β-SiC described in Patent Literature 1 tends to have an increased electrical resistivity due to long time use, and may deteriorate the heating performance of the honeycomb structure. For this reason, it is desirable to provide an electrically heated honeycomb structure in which the electrical resistivity does not easily increase even when used for a long time.

In view of the above circumstances, in one embodiment of the present invention, an object is to provide a SiC powder whose electrical resistivity does not easily increase over time and a method for manufacturing the same. In another embodiment of the present invention, an object is to provide an electrically heated honeycomb structure manufactured using such SiC powder and a method for manufacturing the same.

[1]
A SiC powder comprising 70% by mass or more of a β-SiC, wherein in a volume-based cumulative particle size distribution measured by a laser diffraction method, a D50 is 8 to 35 μm, and a D10 is 5 μm or more.

[2]
The SiC powder according to [1], wherein in the volume-based cumulative particle size distribution measured by a laser diffraction method, a cumulative volume of particles having a particle size of 5 μm or less is 7% or less.

[3]
The SiC powder according to [1] or [2], wherein in the volume-based cumulative particle size distribution measured by the laser diffraction method, the D50 is 15 to 35 μm, and the D10 is 7 to 20 μm.

[4]
The SiC powder according to any one of [1] to [3], wherein in the volume-based cumulative particle size distribution measured by the laser diffraction method, a D90 is 100 μm or less.

[5]
The SiC powder according to any one of [1] to 4, wherein a stacking fault of the β-SIC comprised in the powder is 5% or less.

[6]
The SiC powder according to any one of [1] to [5], wherein a stacking fault of the β-SIC comprised in the powder is more than 2%.

[7]
The SiC powder according to any one of [1] to [6], further comprising one or both of a metallic silicon and a silicide.

[8]
The SiC powder according to any one of [1] to [7], comprising one or more third elements selected from a group consisting of Ni, Al, B, N, Ga, Ge, Ti, Cu, Co, P, Cr and Zr.

[9]
The SiC powder according to [8], wherein a total concentration of the third elements in the powder is 6% by mass or less.

[10]
A method for manufacturing a SiC powder, comprising:
a step of preparing a formed body by forming a mixture comprising a SiC-forming raw material powder and a third element powder;
a step of obtaining a fired body comprising a β-SIC by firing the formed body under an inert atmosphere at a temperature of 1800° C. or lower;
a step of obtaining a pulverized fired body by pulverizing the fired body; and
a step of obtaining a powder having a D50 of 8 to 35 μm and a D10 of 5 μm or more in a volume-based cumulative particle size distribution measured by a laser diffraction method, by classifying the pulverized fired body.

[11]
The method for manufacturing the SiC powder according to [10], wherein in the volume-based cumulative particle size distribution measured by the laser diffraction method, the powder is such that a cumulative volume of particles having a particle size of 5 μm or less is 7% or less.

[12]
The method for manufacturing the SiC powder according to [10] or [11], wherein in the volume-based cumulative particle size distribution measured by the laser diffraction method, the powder has the D50 of 15 to 35 μm and the D10 of 7 to 20 μm.

[13]
The method for manufacturing the SiC powder according to any one of [10] to [12], wherein in the volume-based cumulative particle size distribution measured by the laser diffraction method, the powder has a D90 of 100 μm or less.

[14]
The method for manufacturing the SiC powder according to any one of [10] to [13], wherein the third element-containing powder comprises one or more third elements selected from a group consisting of Ni, Al, B, N, Ga, Ge, Ti, Cu, Co, P, Cr and Zr.

[15]
The method for manufacturing the SiC powder according to any one of [10] to [14], wherein a porosity of the fired body is 35 to 80%.

[16]
The method for manufacturing the SiC powder according to any one of [10] to [15], wherein an average pore diameter of the fired body is 5 to 300 μm.

[17]
A method for manufacturing an electrically heated honeycomb structure, comprising:
a step of obtaining a pillar-shaped honeycomb formed body, which comprises an outer peripheral side wall and partition walls disposed on an inner peripheral side of the outer peripheral side wall, the partition walls partitioning a plurality of cells extending from a first end face to a second end face and serving as a fluid flow path, by forming and drying a green body;
an electrode portion forming step of forming a pair of electrode portions by, respectively applying an electrode portion forming paste to a first region and a second region of a side face of the honeycomb formed body or a honeycomb fired body obtained by firing the honeycomb formed body, and then drying and firing the applied electrode portion forming paste;
wherein one or both of the green body and the electrode portion forming paste comprise the SiC powder according to any one of [1] to [9].

[18]
An electrically heated honeycomb structure manufactured by the method according to [17].

[19]
An electrically heated honeycomb structure comprising the SiC powder according to any one of [1] to [9].

According to one embodiment of the present invention, there is provided a SiC powder whose electrical resistivity does not easily increase over time and a method for manufacturing the same. By using this SiC powder as a raw material for an electrically heated honeycomb structure, it is possible to obtain an electrically heated honeycomb structure with excellent durability whose electrical resistance does not easily increase even after long time use.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

(1. SiC Powder)

According to one embodiment of the present invention, a SiC powder comprises 70% by mass or more of a β-SiC, wherein in a volume-based cumulative particle size distribution measured by a laser diffraction method, a D50 is 8 to 35 μm and a D10 is 5 μm or more.

(1-1 Particle Size Distribution of SiC Powder)

The SiC powder according to one embodiment of the present invention has a D50 of 8 to 35 μm and a D10 of 5 μm or more in a volume-based cumulative particle size distribution measured by a laser diffraction method. Preferably, the D50 is 15 to 35 μm and the D10 is 7 to 20 μm. More preferably, the D50 is 20 to 30 μm and the D10 is 12 to 20 μm. The D50 is a particle size at a cumulative volume of 50% in the cumulative particle size distribution measured above. The D10 is a particle size at a cumulative volume of 10% in the cumulative particle size distribution measured above. When the D50 of the SiC powder is 8 μm or more and the D10 is 5 μm or more, the oxidation of SiC is suppressed, and the electrical resistivity of the SiC powder itself does not easily increase over time. Therefore, an increase in the electrical resistivity of a fired body manufactured using this powder as a raw material powder is advantageously suppressed over time. Further, when the D10 is 20 μm or less and the D50 is 35 μm or less, formability can be ensured.

The SiC powder according to one embodiment of the present invention is such that in a volume-based cumulative particle size distribution measured by the laser diffraction method, a cumulative volume of particles having a particle size of 5 μm or less is 7% or less. In addition to the D50 and the D10, if the cumulative volume of the particles having a particle size of 5 μm or less is small, the oxidation of SiC is further suppressed, and the effect that the electric resistivity of the SiC powder itself does not easily increase over time is further improved. Therefore, an increase in the electrical resistivity of a fired body manufactured using this powder as a raw material powder is further suppressed over time. The cumulative volume of particles having a particle size of 5 μm or less is preferably 5% or less, more preferably 2% or less, and even more preferably 1% or less.

The SiC powder according to one embodiment of the present invention is such that in a volume-based cumulative particle size distribution measured by a laser diffraction method, a D90 is 100 μm or less. When the D90 of the SiC powder is 100 μm or less, the formability of the SiC powder is improved. The D90 of the SiC powder is preferably 80 μm or less, more preferably 60 μm or less, and still more preferably 50 μm or less. The D90 is a particle size at a cumulative volume of 90% in the cumulative particle size distribution measured above.

(1-2. Composition of SiC Powder)

The SiC powder according to one embodiment of the present invention comprises 70% by mass or more of a β-SiC. When the SiC powder comprises β-SiC as a main component, the initial electrical resistivity of the SiC powder itself can be suppressed low, and the initial electrical resistivity of a fired body manufactured using the SiC powder as a raw material powder can be lowered. The SiC powder preferably comprises 75% by mass or more of β-SiC, and more preferably 80% by mass or more of β-SiC. There is no upper limit to the concentration of β-SiC in the SiC powder, and it can be substantially 100% by mass. However, in consideration of adding a third element (typically a metal element(s)) described later to suppress stacking fault and of remaining unreacted raw materials, the concentration of β-SiC in the SiC powder is usually 90% by mass or less, and typically is 85% by mass or less.

The SiC powder according to one embodiment of the present invention may further comprise one or both of a metallic silicon and a silicide (typically a metallic silicide(s)). Metallic silicon is not particularly necessary, but metallic silicon used as a raw material of SiC powder may remain. Further, the silicide may be formed by the reaction of a third element(s) (typically a metal element(s)) described later added for suppressing stacking fault of β-SiC with the metallic silicon used as a raw material of the SiC powder.

The SiC powder according to one embodiment of the present invention comprises one or more third elements selected from the group consisting of Ni, Al, B, N, Ga, Ge, Ti, Cu, Co, P, Cr and Zr. Among these, it is more preferable to comprise one or more third elements selected from the group consisting of Ti, Cr, Co, Ni, Al, and Cu. These third elements contribute to lowering the initial electrical resistivity of the SiC powder itself by suppressing stacking fault of β-SiC, and thus contribute to suppressing the initial electrical resistivity of a fired body manufactured using the powder as a raw material powder low. In addition to the above, it is advantageous that one or more elements selected from the group consisting of N, P, Al and B coexist in the SiC powder in order to keep the initial electrical resistivity of the fired body low. In this case, the total mass of one or more elements selected from the group consisting of N, P, Al and B is preferably 0.0001 to 1% by mass, more preferably 0.001 to 1% by mass, with respect to the mass of SiC.

In order to enhance the effect of suppressing stacking fault of β-SiC, the total concentration of the third element(s) in the SiC powder is preferably 1% by mass or more, more preferably 3% by mass or more. On the other hand, if the concentration of the third element(s) in the SiC powder is too high, the coefficient of thermal expansion of the fired body manufactured using the SiC powder as a raw material powder may increase. Therefore, the total concentration of the third element(s) in the SiC powder is preferably 15% by mass or less, more preferably 10% by mass or less, and still more preferably 6% by mass or less.

(1-3 Stacking Fault)

In one embodiment of the SiC powder according to the present invention, the stacking fault of the β-SiC comprised in the powder can be set to 5% or less, also can be set to 3% or less, and also can be set to 2% or less. On the other hand, in one embodiment of the SiC powder according to the present invention, the stacking fault of the β-SiC comprised in the powder can be set to more than 2%, also can be set to 3% or more, also can be set to 4% or more, and for example, can be set to 3 to 5%. By controlling the particle size distribution of the SiC powder within the above-mentioned range, even if there is a lot of stacking fault of β-SiC, there is almost no adverse influence on the effect that the electrical resistivity of the SiC powder itself does not easily increase over time.

Here, stacking fault of β-SiC will be explained. First, stacking fault is a kind of planar lattice defects (plane defects). Assuming that a perfect crystal is made by periodic stacking of atomic planes, disorder of this stacking regularity (order) is regarded as stacking fault. In the present specification, the stacking fault (%) of β-SiC refers to a value calculated by the following equation (1). Here, A in the following (1) is a value calculated by the following equation (2).

$$\text{Stacking Fault}(\%) = \frac{A}{6.82 \times 10^{-2}A + 2.27 \times 10^{-2}} + 1.7A^3 \quad (1)$$

$$A = \frac{33.6° \text{ Peak Intensity}}{41.4° \text{ Peak Intensity}} \quad (2)$$

The "33.6° peak intensity" in the equation (2) refers to a peak intensity at a scattering angle (2θ) of 33.6° in an X-ray diffraction spectrum by X-ray diffraction (XRD). Further, "41.4° peak intensity" means a peak intensity at a scattering angle (2θ) of 41.4° in an X-ray diffraction spectrum by X-ray diffraction (XRD). In the above X-ray diffraction, a graphite monochromator is used, and X-ray diffraction analysis is performed using CuKα rays having a wavelength of 1.54 Å. The tube voltage is 50 kV, and the tube current is 300 mA. The scanning speed is 2θ=2° min$^{-1}$, and the light receiving slit is 0.3 mm. In this way, the peak intensity at the scattering angle 2θ=33.6° and the peak intensity at the scattering angle 2θ=41.4° in the X-ray diffraction spectrum are measured, and "A" is calculated by the above equation (2). Then, the stacking fault of the β-SiC can be obtained according to the above equation (1). The measurement is performed by sampling a plurality of times (for example, five or more times) from the SiC powder, and the average value is used as the measured value. In addition, as references describing stacking fault of β-SiC include, for example, the following References 1 and 2 can be cited. Reference 1: Journal of the Ceramic Society of Japan, 99 [12], p. 1179 to 1184, (1991). Reference 2: Journal of the Ceramic Society of Japan, 106 [5], p. 483 to 487, (1998).

(1-4 β-SiC Crystallite Size)

The crystallite size of the β-SiC is preferably at least 900 Å, more preferably from 900 to 500,000 Å, and particularly preferably from 1,000 to 500,000 Å. The crystallite size of β-SiC refers to a value calculated by the following equation (3). The following equation (3) is called Scherrer's equation.

Usually, one crystal grain is composed of fine crystals that can be regarded as a plurality of single crystals, and these fine crystals are called crystallites. The size of the crystallite is the "crystallite size". When the crystallite size of the β-SiC is 900 Å or more, it contributes to suppressing the initial electric resistivity of the SiC powder itself low, and can satisfactorily lower the initial electric resistivity of a fired body manufactured using this powder as a raw material powder.

$$t(\text{Å}) = \frac{0.9\lambda}{B\cos\theta_B} \quad (3)$$

"t (Å)" in equation (3) indicates a crystallite size (Å). "λ" indicates the X-ray wavelength (1.54 Å). "B" indicates a half width of a peak having a scattering angle (2θ) of 35.6°. "$\theta_B$" is a value of ½ of the scattering angle (2θ), that is, $\theta_B$=17.8°. The X-ray diffraction spectrum by X-ray diffraction (XRD) can be measured by the same method as the method described in the method for calculating stacking fault of the β-SiC described above. The measurement is performed by sampling a plurality of times (for example, five or more times) from the SiC powder, and the average value is used as the measured value. The following reference 3 can be cited as a reference describing the crystallite size. Reference 3: Yoshio Waseda and Eiichiro Matsubara, "X-ray structural analysis—determining the arrangement of atoms (materials technology series)", UCHIDA ROKAKUHO, Sep. 30, 1999, second edition, p. 119 to 123.

(2. Method for Manufacturing a SiC Powder)

The SiC powder according to the above-described embodiments can be manufactured, for example, by the following manufacturing method.

A method for manufacturing a SiC powder, comprising:
- a step of preparing a formed body by forming a mixture comprising a SiC-forming raw material powder and a third element-containing powder;
- a step of obtaining a fired body comprising a β-SiC by firing the formed body under an inert atmosphere at a temperature of 1800° C. or lower;
- a step of obtaining a pulverized fired body by pulverizing the fired body; and
- a step of obtaining a powder having a D50 of 8 to 35 μm and a D10 of 5 μm or more in a volume-based cumulative particle size distribution measured by a laser diffraction method, by classifying the pulverized fired body.

First, a formed body is prepared by forming a mixture comprising a SiC-forming raw material and a third element-containing powder. A pore forming material may be appropriately added to the mixture. The SiC-forming raw material is not particularly limited as long as it is a raw material powder capable of producing SiC after firing, but typically, a combination of a metallic silicon powder and a carbonaceous powder can be mentioned. From the viewpoint of controlling the pore diameter of the fired body and facilitating pulverization, a D50 of the metallic silicon powder is preferably 5 μm or more, more preferably 15 μm or more. Further, from the viewpoint of ease of forming a formed body, the D50 of the metallic silicon powder is preferably 300 μm or less, more preferably 100 μm or less. Therefore, the D50 of the metallic silicon powder is preferably 5 to 300 μm, more preferably 15 to 100 μm. The D50 of the metallic silicon powder is a particle size at a cumulative volume of 50% in a volume-based cumulative particle size distribution measured by a laser diffraction method.

The purity of the metallic silicon powder is preferably 90% by mass or more, and more preferably 95% by mass or more. The content of oxygen in the metallic silicon powder is preferably 3.0% by mass or less, more preferably 1% by mass or less.

As the carbonaceous powder, it may be either crystalline or amorphous, but amorphous carbonaceous powder is preferred, and carbon black is particularly preferred. One type of carbonaceous powder may be used alone, or two or more types may be used in combination. However, for the reason of easily forming SiC, as the carbonaceous powder, amorphous carbonaceous powder is preferred over crystalline carbon such as black lead (i.e., graphite) (in other words, carbon with a developed crystal structure). For the reason of easily forming SiC, the specific surface area of the carbonaceous powder is preferably 30 $m^2/g$ or more, more preferably 50 $m^2/g$ or more. The upper limit of the specific surface area of the carbonaceous powder is not particularly restricted, but is usually 2000 $m^2/g$ or less, typically 1000 $m^2/g$ or less, more typically 200 $m^2/g$ or less. The specific surface area of the carbonaceous powder is measured by a nitrogen adsorption method.

Further, by using a third element-containing powder (typically a metal powder other than metallic silicon), stacking fault of the generated β-SiC can be reduced. The third element-containing powder may preferably comprise, but is not limited to, one or more third elements selected from the group consisting of Ni, Al, B, N, Ga, Ge, Ti, Cu, Co, P, Cr and Zr. Among these, the third element-containing powder more preferably comprises one or more third metal elements selected from the group consisting of Ti, Cr, Co, Ni, Al and Cu.

The purity of the carbonaceous powder is preferably 95% by mass or more, and more preferably 98% by mass or more.

The mixture containing the SiC-forming raw material powder and the third element-containing powder can be obtained, for example, by mixing these powders with water. For example, with respect to 100 parts by mass of the metallic silicon powder, the carbonaceous powder is preferably mixed so as to be 20 to 40 parts by mass, more preferably mixed so as to be 25 to 35 parts by mass, still more preferable mixed so as to be 30 to 35 parts by mass. Further, with respect to 100 atoms of the metallic silicon powder, the third element-containing powder in total is preferably mixed so as to have 1 to 10 atoms, more preferably mixed so as to be 3 to 8 atoms, still more preferable mixed so as to be 3 to 5 atoms. Further, when the total mass of the metallic silicon powder, the carbonaceous powder, and the third element-containing powder is 100 parts by mass, it is preferable to add 20 to 100 parts by mass of water.

The mixing method is not particularly limited, but for example, a vertical stirrer can be used. The obtained mixture is formed by press forming, extrusion forming or the like to produce a formed body. The shape of the forming body is not particularly limited, and examples thereof include a cylinder, a disk, and a quadrangle disk. The formed body is preferably dried, for example, at a drying temperature of 50 to 100° C.

Next, the formed body is fired at a temperature of 1800° C. or lower under an inert atmosphere to obtain a fired body containing β-SiC. The firing of the formed body is preferably performed in an inert atmosphere such as argon or a vacuum to prevent oxidation. From the viewpoint of suppressing the generation of α-SiC and preferentially generating β-SiC, the firing temperature is preferably 1800° C. or lower, more preferably 1300 to 1500° C. The firing time can be, for example, 1 to 20 hours. Generally, SiC produced by this method is called reaction sintered SiC. Reaction sintered SiC is SiC generated by utilizing a reaction between raw materials.

For the reason of easy pulverization, the fired body is preferably porous. Specifically, from the viewpoint of easiness of pulverization, the porosity of the fired body is preferably 35% or more, more preferably 40% or more. The upper limit of the porosity of the fired body is not particularly set, but from the viewpoint of easy production and shape retention of the formed body, the upper limit is preferably 80% or less, and more preferably 75% or less. Therefore, in one embodiment, the porosity of the fired body can be set to 35% to 80%, and preferably 40% to 75%. The porosity of the fired body can be controlled, for example, by changing the forming pressure. The porosity of the fired body can be increased by adding a pore forming material or reducing the forming pressure. Conversely, the porosity of the fired body can be reduced by increasing the forming pressure.

For the reason of easy pulverization, the average pore diameter of the fired body is preferably 5 µm or more, more preferably 10 µm or more. Further, for the reason of easily flowing during forming and easily obtaining a formed body, the average pore diameter of the fired body is preferably 300 µm or less, more preferably 150 µm or less. Therefore, in one embodiment, the average pore diameter of the fired body can be set to 5 to 300 µm, and preferably 10 to 150 µm. The average pore diameter of the fired body can be controlled by, for example, a method of changing the particle diameter of the raw material such as metallic silicon powder and/or the pore forming material. To increase the average pore diameter of the fired body, the particle diameter may be increased, and conversely, to decrease the average pore diameter of the fired body, the particle diameter may be decreased.

Next, the fired body thus obtained is pulverized to obtain a pulverized fired body. Although there is no particular limitation on the pulverizing method, for example, the pulverization can be performed using an impact type pulverizer or a mortar. Since the particle size distribution cannot be controlled only by pulverization, the pulverized fired body is classified by a sieve, an air classifier or the like to obtain a SiC powder having a desired particle size distribution. In addition to β-SiC, the SiC powder may comprise metallic silicon, a third element(s) (typically metal(s) other than metallic silicon), and a silicide(s) (typically a metallic silicide(s)).

(3. Method for Manufacturing Electrically Heated Honeycomb Structure)

By using the SiC powder according to the present invention as a raw material, for example, an electrically heated honeycomb structure can be manufactured.

Accordingly, in one embodiment the present invention provides a method for manufacturing an electrically heated honeycomb structure, comprising:

a step of obtaining a pillar-shaped honeycomb formed body, which comprises an outer peripheral side wall and partition walls disposed on an inner peripheral side of the outer peripheral side wall, the partition walls partitioning a plurality of cells extending from a first end face to a second end face and serving as a fluid flow path, by forming and drying a green body;

an electrode portion forming step of forming a pair of electrode portions by respectively applying an electrode portion forming paste to a first region and a second region of a side face of the honeycomb formed body or a honeycomb fired body obtained by firing the honeycomb formed body, and then drying and firing the applied electrode portion forming paste;

wherein one or both of the green body and the electrode portion forming paste comprise the above-described SiC powder according to the present invention.

(3-1 Honeycomb Formed Body Manufacturing Step)

In this step, by forming and drying a green body, a pillar-shaped honeycomb formed body, which comprises an outer peripheral side wall and partition walls disposed on an inner peripheral side of the outer peripheral side wall and partitioning a plurality of cells extending from a first end face to a second end face and serving as a fluid flow path, is obtained. The manufacture of the honeycomb formed body can be performed according to the method for manufacturing a honeycomb formed body in a publicly known method for manufacturing a honeycomb structure. For example, at first, in addition to ceramic materials such as SiC powder (silicon carbide powder) and metallic silicon powder, a binder, a surfactant, a pore forming material, water and the like are mixed to prepare a forming raw material. In one embodiment, the SiC powder according to the present invention described above can be used for at least a part of the SiC powder. In another embodiment, the above-described SiC powder according to the present invention can be solely used as the SiC powder. The metallic silicon powder needs to be added when the material of the honeycomb structure portion is silicon-silicon carbide composite material, but when the material of the honeycomb structure portion is substantially silicon carbide, it does not need to be added.

The content of the metallic silicon powder is not particularly limited, but can be 15 to 50 parts by mass when the total mass of the SiC powder and the metallic silicon powder is 100 parts by mass. The D50 of the metallic silicon powder is not particularly limited, but can be 3 to 50 µm. The D50 of the metallic silicon powder is a particle size at a cumulative volume of 50% in a volume-based cumulative particle size distribution measured by a laser diffraction method. The D50 of the SiC powder is preferably 8 to 35 µm, as described above.

Examples of the binder include methylcellulose, hydroxypropylmethylcellulose, hydroxypropoxylcellulose, hydroxyethylcellulose, carboxymethylcellulose, and polyvinyl alcohol, and the like. These may be used alone or in combination of two or more. Among these, it is preferable to use methyl cellulose and hydroxypropoxyl cellulose in combination. The content of the binder is preferably 2 to 15 parts by mass when the total mass of the SiC powder and the metallic silicon powder is 100 parts by mass.

The content of the water is preferably 20 to 60 parts by mass when the total mass of the SiC powder and the metallic silicon powder is 100 parts by mass.

As the surfactant, ethylene glycol, dextrin, fatty acid soap, polyalcohol and the like can be used. These may be used alone or in combination of two or more. The content of the surfactant is preferably 0.1 to 2.0 parts by mass when the total mass of the SiC powder and the metallic silicon powder is 100 parts by mass.

The pore forming material is not particularly limited as long as it becomes pores after firing, and examples thereof include graphite, starch, foamed resin, water-absorbing resin, and silica gel and the like. These may be used alone or in combination of two or more. The content of the pore forming material is preferably 0.5 to 10.0 parts by mass when the total mass of the SiC powder and the metallic silicon powder is 100 parts by mass. The D50 of the pore forming material is preferably 10 to 30 µm. The D50 of the pore former means is a particle size at a cumulative volume of 50% in a volume-based cumulative particle size distribution measured by a laser diffraction method. When the pore forming material is a water-absorbing resin, the average particle diameter of the pore forming material is the average particle diameter after water absorption.

Next, the obtained forming raw material is kneaded to form a green body. There is no particular limitation on the method of kneading the honeycomb forming raw material to form the green body, and examples thereof include a method using a kneader, a vacuum kneader, or the like.

Next, the green body is extruded to form a honeycomb formed body. At the time of extrusion forming, a die having a desired overall shape, cell shape, partition wall thickness, cell density, and the like can be used. The obtained honeycomb formed body is preferably dried. The dried honeycomb formed body may be referred to as "honeycomb dried body". The drying method is not particularly limited, and examples thereof include an electromagnetic heating method such as microwave heat drying and high-frequency dielectric heat drying, and an external heating method such as hot air drying and superheated steam drying. Among these, it is preferable to dry a certain amount of water with the electromagnetic wave heating method, and then dry the remaining water with the external heating method, so that the whole formed body can be dried quickly and uniformly without generating cracks. As drying conditions, it is preferable to remove 30 to 99% by mass of water with respect to the amount of water before drying with the electromagnetic wave heating method, and then to reduce the water content to 3% by mass or less by an external heating method. As the electromagnetic wave heating method, dielectric heat drying is preferable, and as the external heating method, hot air drying is preferable. Hereinafter, the honeycomb formed body after drying may be referred to as "honeycomb dried body". When the length in the central axis direction of the honeycomb formed body (honeycomb dried body) is not the desired length, the both ends of the honeycomb formed body may be cut to have a desired length.

(3-2. Electrode Portion Forming Step)

In the electrode portion forming step, a pair of electrode portions is formed by respectively applying an electrode portion forming paste to a first region and a second region of the side face of the honeycomb formed body or a honeycomb fired body obtained by firing the honeycomb formed body, and then drying and firing the applied electrode portion forming paste. It is preferable that the electrode portion forming paste comprise the SiC powder according to the present invention. It is more preferable that the SiC powder in the electrode portion forming paste comprise solely the SiC powder according to the present invention.

The electrode portion forming paste can be prepared, for example, by adding additives such as a binder, a humectant, a dispersant, and water to the SiC powder according to the present invention and the metallic silicon powder, and kneading them. Typically, the SiC powder functions as an aggregate, and the metallic silicon powder functions as a binder between the aggregates. Metal (metallic silicon, metals other than metallic silicon) and/or metal silicide that may be contained in the SiC powder also functions as a binder. The method of kneading is not particularly limited, and for example, a vertical stirrer can be used.

In order to combine the SiC powder with the metallic silicon effectively, the content of the metallic silicon powder is preferably 5 to 40 parts by mass and more preferably 10 to 30 parts by mass when the total mass of the SiC powder and the metallic silicon powder is 100 parts by mass. In addition, the D50 of the metallic silicon powder is preferably 1 to 50 μm, more preferably 4 to 20 μm for the reason that the SiC powder can be easily combined with the metallic silicon. The D50 of the metallic silicon powder is a particle size at a cumulative volume of 50% in a volume-based cumulative particle size distribution measured by a laser diffraction method. Further, the D50 of the SiC powder is preferably 8 to 35 μm, as described above.

Examples of the binder include methylcellulose, hydroxypropylmethylcellulose, hydroxypropoxylcellulose, hydroxyethylcellulose, carboxymethylcellulose, and polyvinyl alcohol, and the like. These may be used alone or in combination of two or more. The content of the binder is preferably 0.1 to 5.0 parts by mass when the total mass of the SiC powder and the metallic silicon powder is 100 parts by mass.

As the humectant, glycerin can be mentioned. The content of the humectant is preferably 0 to 10 parts by mass when the total mass of the SiC powder and the metallic silicon powder is 100 parts by mass.

As the dispersant, for example, surfactants such as glycerin, ethylene glycol, dextrin, fatty acid soap, polyalcohol, polyacrylic acid-based dispersant, or the like can be used. These may be used alone or in combination of two or more. The content of the surfactant is preferably 0.1 to 2.0 parts by mass when the total mass of the SiC powder and the metallic silicon powder is 100 parts by mass.

The content of the water is preferably 15 to 60 parts by mass when the total mass of the SiC powder and the metallic silicon powder is 100 parts by mass.

Further, the electrode portion forming paste can comprise an oxide for the reason that it reduces the porosity, thereby reducing the electric resistivity of the electrode portion. The oxide is not particularly limited, but may be an oxide of one or more elements selected from the group consisting of B, Mg, Al, Si, P, Ti, Zr, Pb, Li, Na, Ba, Ca, Fe and Sr. Preferably, an oxide of one or more elements selected from the group consisting of B, Mg, Al, Si, P, Ti and Zr can be mentioned. Among the oxides, oxides of one or more elements selected from the group consisting of Mg, Al, and Si are more preferable from the viewpoint of low thermal expansion. Specific examples of the oxide include oxides of one kind of element such as MgO, $SiO_2$, and $Al_2O_3$, as well as oxides of two or more elements (complex oxides) such as $2MgO.2Al_2O_3.5SiO_2$ (cordierite), which is a compound of MgO, $SiO_2$ and $Al_2O_3$, and crystallized glass containing cordierite as a main component such as MgO—SiO—$Al_2O_3$—$B_2O_3$, and $AlTiO_5$ (aluminum titanate), which is a compound of $Al_2O_3$ and $TiO_2$. From the viewpoint of enhancing the high-temperature durability, it is preferable that at least a part of the oxide in the electrode portion is crystalline. One kind of oxide may be used alone, or two or more kinds may be used in combination. When the total volume of the SiC powder and the metallic silicon powder is 100 parts by volume, the oxide is preferably contained in a total amount of 1 to 10 parts by volume, more preferably 1 to 5 parts by volume.

Next, the obtained electrode portion forming paste is respectively applied to a first region and a second region of a side face of the honeycomb formed body or a honeycomb fired body obtained by firing the honeycomb formed body. The electrode portion forming paste is preferably applied such that, in a cross section orthogonal to the cell extending direction of the honeycomb formed body or the honeycomb fired body, the first region is located on the opposite side of the second region across the center of the honeycomb formed body or the honeycomb fired body.

The method for applying the electrode portion forming raw material to the side face of the honeycomb formed body or the honeycomb fired body obtained by firing the honeycomb formed body is not particularly limited, but for example, a printing method such as screen printing may be used. The applied thickness can be but is not limited to, 25-500 μm, typically 75-350 μm.

For finishing the firing step at once, it is preferable to apply the electrode portion forming paste to the side face of the dried honeycomb formed body. However, the dried honeycomb formed body may be fired to prepare a honeycomb fired body first, and the electrode portion forming paste may be applied to the side face of the honeycomb fired body. In addition, the firing conditions for the honeycomb formed body can be the same as the firing conditions for the electrode portion forming paste described below.

Next, it is preferable to dry the electrode portion forming paste applied to the side face of the honeycomb formed body or the honeycomb fired body. The drying conditions are preferably 50 to 120° C. and 1 to 24 hours. Thereafter, the honeycomb formed body with the electrode portion forming paste or the honeycomb fired body with the electrode portion forming paste is fired, whereby a honeycomb structure having a pair of electrode portions can be manufactured.

After drying and before firing, it is preferable to perform temporary firing in order to remove the binder and the like. For example, the temporary firing can be performed in the air atmosphere at 400 to 500° C. for 0.5 to 20 hours. As the firing conditions thereafter, it is preferable to heat at 1350 to 1500° C. for 1 to 20 hours in an inert atmosphere such as nitrogen or argon. The methods of temporary firing and firing are not particularly limited, and can be performed using an electric furnace, a gas furnace, or the like. Further, after firing, it is preferable to perform an oxidation treatment at 1000 to 1350° C. for 1 to 10 hours to improve durability. The purpose of the oxidation treatment is mainly to oxidize metallic silicon. Although the SiC powder may also be oxidized, as described above, the SiC powder according to the present invention is hardly oxidized, and thus the oxidation of the SiC powder by the oxidation treatment is limited.

(4. Electrically Heated Honeycomb Structure)

Figure 1:
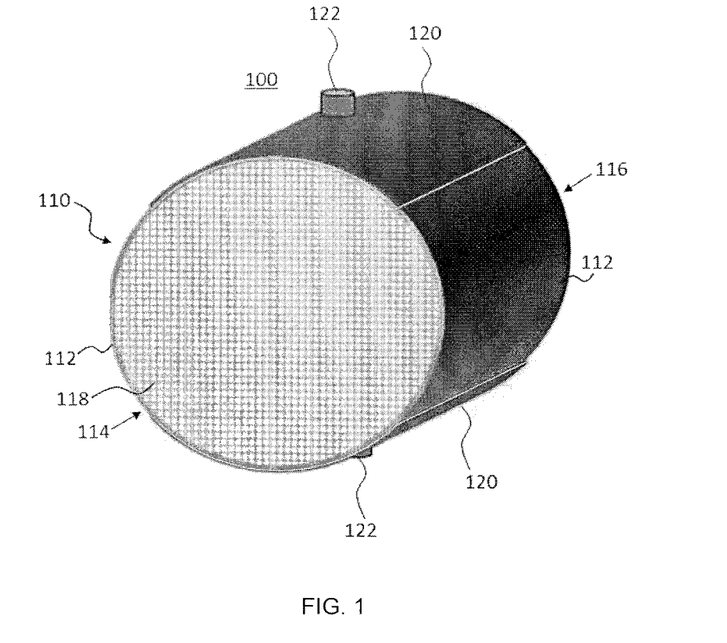
FIG. 1 is a perspective view schematically showing a honeycomb structure according one embodiment of the present invention.

The structure of the electrically heated honeycomb structure that can be manufactured by the above-described manufacturing method will be exemplarily described. FIG. 1 is a perspective view schematically showing one embodiment of the electrically heated honeycomb structure according to the present invention. The electrically heated honeycomb structure 100 according to the illustrated embodiment comprises a pillar-shaped honeycomb structure portion 110 having an outer peripheral side wall 112 and partition walls 118 disposed on an inner peripheral side of the outer peripheral side wall 112 and partitioning a plurality of cells extending from a first end face 114 to a second end face 116 and serving as a fluid flow path, and comprises at least one electrode portion 120 attached to the outer surface of the outer peripheral side wall 112 of the pillar-shaped honeycomb structure portion 110.

Each cell may penetrate from the first end face 114 to the second end face 116 by opening both the first end face 114 and the second end face 116 (flow-through type honeycomb structure). However, from the viewpoint of improving the particulate matter (PM) collection performance when the electrically heated honeycomb structure is used as a filter, it is preferable that honeycomb structure portion 110 has a plurality of first cells extending from the first end face 114 to the second end face 116, the first end face 114 being open and the second end face 116 being plugged; and a plurality of second cells extending from the first end face 114 to the second end face 116, the first end face 114 being plugged and the second end face 116 being open (wall flow type honeycomb structure). In this case, in the honeycomb structure portion 110, the first cells and the second cells can be alternately arranged with the partition walls 118 interposed therebetween such that both end faces have a checkered pattern.

(4-1 Honeycomb Structure Portion)

For the purpose of facilitating electric heating, the honeycomb structure portion can be formed of a ceramic containing one or both of Si (metallic silicon) and SiC (silicon carbide). Examples of the ceramics containing one or both of Si and SiC include a silicon-silicon carbide composite, a silicon-oxide composite, a silicon carbide-oxide composite, and a silicon-silicon carbide-silicon nitride composite. In one embodiment, the SiC constituting the honeycomb structure portion is derived from the SiC powder according to the present invention, and in a more preferred embodiment, the SiC constituting the honeycomb structure portion is substantially derived only from the SiC powder according to the present invention. In addition, in the present invention, a case where a pillar-shaped honeycomb structure portion is formed only of Si is also referred to as ceramic as long as it is a sintered body.

For the purpose of facilitating electric heating, in the pillar-shaped honeycomb structure portion, the total volume ratio of Si and SiC is more preferably 60% or more, still more preferably 80% or more, and still more preferably 95% or more.

Other ceramics that can be included in the honeycomb structure portion include, but are not limited to, ceramics such as cordierite, mullite, zircon, aluminum titanate, silicon nitride, zirconia, spinel, indialite, sapphirine, corundum, titania, and the like. These other ceramics may be used alone or in combination of two or more.

The thermal expansion coefficient of the honeycomb structure portion 110 is preferably from 3.5 to 6.0 ppm/K, more preferably from 3.5 to 4.5 ppm/K, from the viewpoint of thermal shock resistance. In this specification, the thermal expansion coefficient refers to a coefficient of linear thermal expansion of 25 to 800° C. measured by a method according to JIS R1618: 2002, unless otherwise specified. As the thermal expansion meter, "TD5000S (product name) available from Bruker AXS can be used.

When a voltage is applied between the pair of electrode portions, the honeycomb structure portion is energized and can generate heat by Joule heat. Therefore, the electrically heated honeycomb structure portion according to the present invention can be suitably used as a heater. The applied voltage is preferably 12 to 900 V, but the applied voltage can be changed as appropriate.

The volume resistivity of the honeycomb structure portion is not particularly limited as long as the honeycomb structure portion can generate heat by Joule heat. The volume resistivity of the honeycomb structure portion may be appropriately selected in accordance with the use of the electrically heated honeycomb structure portion. For example, the volume resistivity of the honeycomb structure portion can be 0.01 to 200 Ωcm, preferably 0.05 to 50 Ωcm, and more preferably 0.1 to 5 Ωcm. Here, the volume resistivity of the honeycomb structure portion is a value measured at room temperature (25° C.) by a four-terminal method.

The partition walls can be porous. In this case, the porosity of the partition walls of the honeycomb structure portion is not particularly limited, but can be, for example, 35 to 60%, and preferably 35 to 45%. The porosity is a value measured by a mercury porosimeter.

The average pore diameter of the partition walls of the honeycomb structure portion is not particularly limited, but may be, for example, 2 to 15 µm, and preferably 3 to 8 µm. The average pore diameter is a value measured by a mercury porosimeter.

The thickness of the partition walls in the honeycomb structure portion can be, for example, 0.1 to 0.3 mm, and preferably 0.1 to 0.15 mm.

The cell density can be, for example, 40 to 150 cells/cm$^2$, preferably 60 to 100 cells/cm$^2$, in a cross section orthogonal to the cell flow path direction.

The shape of the cell in a cross section orthogonal to the cell flow path direction is not limited, but is preferably a quadrangle, a hexagon, an octagon, or a combination thereof. Among these, a square and a hexagon are preferred. With such a cell shape, the pressure loss is reduced when exhaust gas flows through the honeycomb structure portion, and the purification performance by the catalyst is improved.

The outer shape of the honeycomb structure portion is not particularly limited as long as it has a pillar shape. For example, a pillar shape with end faces having a circular shape (cylindrical shape), a pillar shape with end faces having an oval shape, or a pillar shape with end faces having a polygonal shape (quadrangle, pentagon, hexagon, heptagon, octagon, etc.) can be adopted. In addition, the size of the honeycomb structure portion is preferably from 2000 to 20,000 mm$^2$, more preferably from 4000 to 15000 mm$^2$, from the viewpoint of thermal shock resistance. In addition, the length of the honeycomb structure portion in the central axis direction is preferably 30 to 200 mm, more preferably 30 to 120 mm, from the viewpoint of thermal shock resistance.

(4-2 Electrode Portion)

The electrically heated honeycomb structure 100 according to the present embodiment comprises a pair of electrode portions 120 attached to the outer surface of the outer peripheral side wall 112 of the pillar-shaped honeycomb structure portion 110. In a preferred embodiment, a pair of electrode portions 120 are extended in a band shape in the cell flow path direction on the outer surface of the outer peripheral side wall 112 of the honeycomb structure portion 110 with the central axis of the honeycomb structure portion 110 interposed therebetween. Thereby, when a voltage is applied between the pair of electrode portions 120, the electrically heated honeycomb structure 100 can suppress the bias of the current flowing in the honeycomb structure portion 110, and the bias of temperature distribution in the honeycomb structure portion 110 can be suppressed. The electrode portion 120 may be provided with a terminal connection portion 122 for facilitating connection of terminals.

In one embodiment, the electrode portion has a porous structure in which SiC particles as an aggregate are bound by a binder. In a preferred embodiment, the SiC particles constituting the electrode portion are derived from the SiC powder according to the present invention, and in a more preferred embodiment, the SiC constituting the electrode portion is substantially derived only from the SiC powder according to the present invention. Further, in a preferred embodiment, the binder constituting the electrode portion comprises one, two or three kinds of binders selected from the group consisting of metallic silicon, metals other than metallic silicon, and metal silicide.

The average thickness of the electrode portion is preferably 25 µm or more, more preferably 50 µm or more, and even more preferably 75 µm or more from the viewpoint of enhancing uniform heat generation. In addition, the average thickness of the electrode portion is preferably 500 µm or less, more preferably 350 µm or less, and even more preferably 250 µm or less, from the viewpoint of preventing cracking and peeling due to firing. The average thickness of the electrode portion is calculated by measuring the thickness of the electrode portion at a plurality of locations from an image obtained by imaging a cross section perpendicular to the cell extending direction of the electrically heated honeycomb structure with a scanning electron microscope (SEM).

The volume resistivity of the electrode portion is preferably from 0.01 to 0.8 Ωcm, and more preferably from 0.01 to 0.4 Ωcm, from the viewpoint of enhancing uniform heat generation. The volume resistivity of the electrode portion can be determined by a four-terminal method.

As shown in FIG. 1, in the electrically heated honeycomb structure 100 according to the present embodiment, each of the pair of electrode portions 120 extends from one end face to the other end face in the flow path direction of the cells of the honeycomb structure portion 110, and is formed in a band shape. In this manner, since the pair of electrode portions 120 are disposed throughout between both the end faces of the honeycomb structure portion 110, when a voltage is applied between the pair of electrode portion 120, the bias of the current flowing in the honeycomb structure portion 110 can be more effectively suppressed. Then, by suppressing the bias of the current flowing in the honeycomb structure portion 110, the bias of the temperature distribution in the honeycomb structure portion 110 can be more effectively suppressed. "each of the pair of electrode portions 120 extends from one end face to the other end face in the flow path direction of the cells of the honeycomb structure portion 110, and is formed in a band shape" means that one end in the cell flow path direction of each electrode portion 120 is in contact with the periphery of one end face 114 of the honeycomb structure portion 110, and the other end in the cell flow path direction of the electrode portion 120 is in contact with the periphery of the other end face 116 of the honeycomb structure portion 110.

Figure 2:
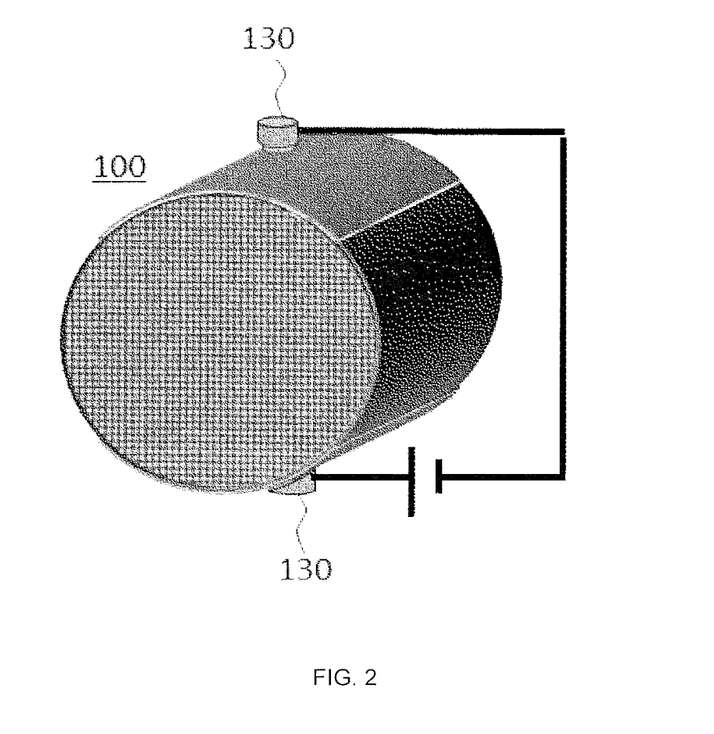
FIG. 2 is a schematic diagram for explaining a method of measuring a conduction resistance.

In one embodiment of the electrically heated honeycomb structure according to the present invention, the conduction resistance can be set to 100Ω or less. The conduction resistance is determined under the following measurement conditions. Terminals 130 are respectively connected to the central part in the cell extending direction of each electrode portion and the central part in the outer peripheral direction of the honeycomb structure portion (see FIG. 2). Next, after applying a voltage of 30 V between both terminals, a resistance value is determined based on a current value after 30 seconds. The conduction resistance is preferably 100Ω or less, more preferably 50Ω or less, and for example, 2 to 40Ω.

(4-3 Applications)

The electrically heated honeycomb structure according to the present invention can be used, for example, as a ceramic heater or otherwise used as a catalyst carrier. The electrically heated honeycomb structure according to the present invention can be used as an EHC by supporting a catalyst. Furthermore, the electrically heated honeycomb structure according to the present invention can also be used as a wall flow type exhaust gas filter (DPF, GPF, and the like). In this case, a method of using the electrically heated honeycomb structure comprising electrically heating it at the time of heating for filter regeneration can be considered.

EXAMPLES

Hereinafter, examples for better understanding the present invention and its advantages will be described, but the present invention is not limited to the examples.

<1. Manufacture of SiC Fired Body>

(SiC Fired Body 1)

74.5 g of metallic silicon powder having a D50 of 79 μm (density 2.33 g/cm$^3$), 25.5 g of carbon black powder having a specific surface area of 110 m$^2$/g, 7.8 g of Ni powder having a D50 of 35 μm, and 50 g of water were prepared. A mixed powder obtained by mixing these with a planetary centrifugal mixer was press formed to manufacture a cylindrical formed body of φ25 mm×H15 mm. Next, after the obtained formed body was dried at 100° C., it was fired at 1450° C. in an argon atmosphere for 2 hours thereby obtaining a fired body.

(SiC Fired Body 2)

73.7 g of metallic silicon powder having a D50 of 79 μm (density 2.33 g/cm$^3$), 26.3 g of carbon black powder having a specific surface area of 110 m$^2$/g, 7.7 g of Ni powder having a D50 of 35 μm, and 50 g of water were prepared. A mixed powder obtained by mixing these with a planetary centrifugal mixer was press formed to manufacture a cylindrical formed body of φ25 mm×H15 mm. Next, after the obtained formed body was dried at 100° C., it was fired at 1450° C. in an argon atmosphere for 2 hours thereby obtaining a fired body.

(SiC Fired Body 3)

74.5 g of metallic silicon powder having a D50 of 79 μm (density 2.33 g/cm$^3$), 25.5 g of carbon black powder having a specific surface area of 110 m$^2$/g, 4.7 g of Ni powder having a D50 of 35 μm, 4 g of methylcellulose, and 50 g of water were prepared. A mixed powder obtained by mixing these with a planetary centrifugal mixer was extrusion formed to manufacture a prismatic shaped formed body of 25 mm×5 mm×50 mm. Next, after the obtained formed body was dried at 100° C., it was degreased in the air atmosphere at 300° C. for 5 hours and then fired at 1450° C. in an argon atmosphere for 2 hours thereby obtaining a fired body.

(SiC Fired Body 4)

73.7 g of metallic silicon powder having a D50 of 79 μm (density 2.33 g/cm$^3$), 26.3 g of carbon black powder having a specific surface area of 110 m$^2$/g, 3.5 g of Al powder having a D50 of 13 μm, 4 g of methylcellulose, and 50 g of water were prepared. A mixed powder obtained by mixing these with a planetary centrifugal mixer was extrusion formed to manufacture a prismatic shaped formed body of 25 mm×5 mm×50 mm. Next, after the obtained formed body was dried at 100° C., it was degreased in the air atmosphere at 300° C. for 5 hours and then fired at 1450° C. in an argon atmosphere for 2 hours thereby obtaining a fired body.

(SiC Fired Body 5)

73.7 g of metallic silicon powder having a D50 of 79 μm (density 2.33 g/cm$^3$), 26.3 g of carbon black powder having a specific surface area of 110 m$^2$/g, 12.0 g of Zr powder having a D50 of 11 μm, and 50 g of water were prepared. A mixed powder obtained by mixing these with a planetary centrifugal mixer was press formed to manufacture a cylindrical formed body of φ25 mm×H15 mm. Next, after the obtained formed body was dried at 100° C., it was fired at 1450° C. in an argon atmosphere for 2 hours thereby obtaining a fired body.

(SiC Fired Body 6)

73.7 g of metallic silicon powder having a D50 of 79 μm (density 2.33 g/cm$^3$), 26.3 g of carbon black powder having a specific surface area of 110 m$^2$/g, 8.3 g of Cu powder having a D50 of 28 μm, and 50 g of water were prepared. A mixed powder obtained by mixing these with a planetary centrifugal mixer was press formed to manufacture a cylindrical formed body of φ 25 mm×H15 mm. Next, after the obtained formed body was dried at 100° C., it was fired at 1450° C. in an argon atmosphere for 2 hours thereby obtaining a fired body.

(SiC Fired Body 7)

73.7 g of metallic silicon powder having a D50 of 79 μm (density 2.33 g/cm$^3$), 26.3 g of carbon black powder having a specific surface area of 110 m$^2$/g, 7.7 g of Co powder having a D50 of 5 μm, and 50 g of water were prepared. A mixed powder obtained by mixing these with a planetary centrifugal mixer was press formed to manufacture a cylindrical formed body of φ 25 mm×H15 mm. Next, after the obtained formed body was dried at 100° C., it was fired at 1450° C. in an argon atmosphere for 2 hours thereby obtaining a fired body.

(SiC Fired Body 8)

73.7 g of metallic silicon powder having a D50 of 79 μm (density 2.33 g/cm$^3$), 26.3 g of carbon black powder having a specific surface area of 110 m$^2$/g, 6.3 g of Ti powder having a D50 of 20 μm, and 50 g of water were prepared. A mixed powder obtained by mixing these with a planetary centrifugal mixer was press formed to manufacture a cylindrical formed body of φ 25 mm×H15 mm. Next, after the obtained formed body was dried at 100° C., it was fired at 1450° C. in an argon atmosphere for 2 hours thereby obtaining a fired body.

The porosity and the average pore diameter of each of the samples of the obtained SiC fired bodies 1 to 8 were measured using a porosimeter (Autopore IV9520 available from Micromeritics Instrument Corp.). The results are shown in Table 1.

TABLE 1

| SiC fired body | Metal concentration (% by mass) | Porosity (%) | Average pore diameter (μm) |
| --- | --- | --- | --- |
| 1 | 7.8 | 45% | 53 |
| 2 | 7.7 | 40% | 55 |
| 3 | 4.7 | 65% | 65 |
| 4 | 3.5 | 69% | 68 |
| 5 | 12.0 | 49% | 54 |
| 6 | 8.3 | 48% | 56 |
| 7 | 7.7 | 50% | 53 |
| 8 | 6.3 | 48% | 55 |

<2. Manufacture of SiC Powder>

The obtained SiC fired bodies 1 to 8 were selected and pulverized according to the test numbers shown in Table 2, and then classified by an air classifier to obtain the SiC powder of the Examples and the Comparative Examples having the particle size distributions shown in Table 2. The particle size distributions shown in Table 2 were determined based on the volume-based cumulative particle size distribution measured by a laser diffraction type particle size distribution analyzer LA-950V2 available from HORIBA, Ltd.

When the type of the SiC crystal phase was analyzed by X-ray diffraction (XRD) for each of the SiC powder of the Examples and the Comparative Examples, only β-SiC was detected in every case. Further, the stacking fault (%) of β-SiC was determined for each of the SiC powder of the Example and the Comparative Example according to the method described above. The results are shown in Table 2.

Further, when the crystallite size of each of the SiC powder of the Examples and the Comparative Examples was determined according to the method described above, it was no less than 1000 Å in every case.

The composition of each of the SiC powder of the Examples and the Comparative Examples was analyzed by X-ray diffraction (XRD). The composition analysis was performed by performing pattern fitting using a WPPD (whole powder pattern decomposition) method. The results are shown in Table 2. Nickel silicide was detected in the Example using the SiC fired bodies 1 to 3, aluminum was detected in the Example using the SiC fired body 4, zirconium silicide was detected in the Example using the SiC fired body 5, copper silicide was detected in the Example using the SiC fired body 6, cobalt silicide was detected in the Example using the SiC fired body 7, and titanium silicide was detected in the Example using the SiC fired body 8, respectively.

<3. Manufacture of Electrically Heated Honeycomb Structure>

(1) Preparation of Electrode Portion Forming Paste 72 g of each SiC powder of the Examples and the Comparative Examples manufactured above, 28 g of metallic silicon powder, 1 g of cordierite powder as oxide particles, 1 g of methylcellulose, 5 g of glycerin, 0.5 g of polyacrylic acid-based dispersant and 30 g of water were mixed with a planetary centrifugal mixer to prepare an electrode portion forming paste.

(2) Preparation of Honeycomb Dried Body 6 kg of metallic silicon powder, 14 kg of SiC powder, 1 kg of cordierite powder, 1.6 kg of methylcellulose, 8 kg of water were mixed and kneaded with a kneader to prepare a honeycomb forming raw material. Next, the obtained honeycomb forming raw material was kneaded in a vacuum kneading machine to obtain a green body, and the obtained green body was extruded to obtain a cylindrical honeycomb formed body. The obtained honeycomb formed body was dried at 120° C. to obtain a honeycomb dried body.

(3) Preparation of Honeycomb Structure

The prepared electrode portion forming paste was applied to the side face of the obtained honeycomb dried body at a thickness of 200 μm, and dried at 80° C. to obtain a honeycomb dried body with slurry for forming an electrode. Specific applying conditions were as follows. The electrode portion forming paste was screen-printed at two places in a band shape over the entire length between both end faces of the honeycomb dried body in a manner such that, when the honeycomb dried body is observed in a cross section orthogonal to the cell flow path direction, the central angle defined by the two line segments connecting both ends of each slurry and the central axis of the honeycomb dried body became 50°. Further, the electrode portion forming pastes at the two places were arranged so as to be in a positional relationship opposite to each other with the center axis of the honeycomb dried body interposed therebetween.

Next, the honeycomb dried body with the electrode portion forming paste was degreased, fired, and subjected to oxidation treatment to manufacture an electrically heated honeycomb structure. The degreasing was performed in the air at 450° C. for 5 hours. The firing was performed in an argon atmosphere at 1450° C. for 2 hours. The oxidation treatment was performed in the air at 1000° C. for 5 hours.

The honeycomb structure portion of the obtained electrically heated honeycomb structure had a partition wall thickness of 101.6 μm and a cell density of 93 cells/cm². The diameter of both end faces of the honeycomb structure portion was 100 mm, and the length in the cell extending direction was 100 mm.

(4) Volume Resistivity of Electrode Portion

An electrode portion test piece having a shape of 5 mm (peripheral direction)×40 mm (axial direction)×75 μm (thickness) was sampled from the obtained electrically heated honeycomb structure. Then, the electrical resistance at room temperature in a direction perpendicular to the thickness direction of the test piece was measured by a four-terminal method, and the volume resistivity was calculated from the shape of the test piece.

Further, the volume resistivity of the electrode portion was also measured after aging the obtained honeycomb structure at 1300° C. for 50 hours in air atmosphere. Table 2 shows the rate of change in volume resistivity before and after the aging (volume resistivity after aging/volume resistivity before aging). It would be a problem if the rate of change in the volume resistivity under an assumed use environment is 2.5 times or more.

TABLE 2

| Test number | SiC fired body | Composition (% by mass) | SiC Crystal phase | β-SiC stacking fault (%) | Particle size distribution | | | | Electrode portion | | Resistance change rate after aging (times) |
|---|---|---|---|---|---|---|---|---|---|---|---|
| | | | | | cumulative volume % of particle size of 5 μm or less | D10 (μm) | D50 (μm) | D90 (μm) | Before aging (Ωcm) | After aging (Ωcm) | |
| Example 1 | 1 | SiC: 79%, Si: 7%, Nickel silicide: 14% | β | 2% | 0.3 | 13.1 | 23.0 | 44.8 | 0.10 | 0.18 | 1.8 |
| Example 2 | 1 | | β | 2% | 0.0 | 19.8 | 30.7 | 44.9 | 0.08 | 0.13 | 1.7 |
| Example 3 | 1 | | β | 2% | 5.2 | 6.7 | 17.3 | 42.8 | 0.11 | 0.22 | 2.0 |
| Example 4 | 1 | | β | 2% | 1.3 | 10.9 | 20.4 | 34.1 | 0.11 | 0.20 | 1.8 |
| Example 5 | 1 | | β | 2% | 0.2 | 9.5 | 14.0 | 21.1 | 0.13 | 0.25 | 1.9 |
| Example 6 | 1 | | β | 2% | 0.0 | 16.9 | 30.0 | 55.0 | 0.08 | 0.13 | 1.7 |
| Example 7 | 1 | | β | 2% | 5.0 | 8.5 | 10.0 | 19.0 | 0.12 | 0.24 | 2.0 |
| Example 8 | 2 | SiC: 81%, Si: 5%, Nickel silicide: 14% | β | 5% | 0.8 | 11.7 | 20.8 | 37.5 | 0.13 | 0.23 | 1.8 |
| Example 9 | 2 | | β | 5% | 0.1 | 12.4 | 20.2 | 31.4 | 0.13 | 0.23 | 1.8 |
| Example 10 | 2 | | β | 5% | 9.3 | 5.4 | 16.2 | 53.7 | 0.14 | 0.30 | 2.2 |
| Example 11 | 3 | SiC: 81%, Si: 10%, Nickel suicide: 9% | β | 3% | 0.1 | 12.4 | 21.3 | 35.0 | 0.11 | 0.18 | 1.7 |
| Example 12 | 3 | | β | 3% | 0.0 | 13.9 | 24.2 | 41.5 | 0.10 | 0.17 | 1.7 |
| Example 13 | 4 | SiC: 82%, Si: 15%, Aluminum: 3% | β | 3% | 0.3 | 13.0 | 23.5 | 45.0 | 0.13 | 0.23 | 1.8 |
| Example 14 | 5 | SiC: 76%, Si: 7%, Zirconium suicide: 17% | β | 4% | 0.3 | 12.8 | 22.5 | 44.2 | 0.12 | 0.22 | 1.8 |
| Example 15 | 6 | SiC: 78%, Si: 14%, Copper silicide: 8% | β | 3% | 0.3 | 13.3 | 23.3 | 45.5 | 0.12 | 0.22 | 1.8 |

TABLE 2-continued

| | | | | β-SiC stacking fault (%) | Particle size distribution | | | | Electrode portion | | |
|---|---|---|---|---|---|---|---|---|---|---|---|
| Test number | SiC fired body | Composition (% by mass) | SiC Crystal phase | | cumulative volume % of particle size of 5 μm or less | D10 (μm) | D50 (μm) | D90 (μm) | Before aging (Ωcm) | After aging (Ωcm) | Resistance change rate after aging (times) |
| Example 16 | 7 | SiC: 79%, Si: 7%, Cobalt suicide: 14% | β | 4% | 0.3 | 13.2 | 22.8 | 44.8 | 0.11 | 0.20 | 1.8 |
| Example 17 | 8 | SiC: 80%, Si: 7%, Titanium suicide: 13% | β | 4% | 0.3 | 13.0 | 23.0 | 45.0 | 0.11 | 0.20 | 1.8 |
| Comparative Example 1 | 1 | SiC: 79%, Si: 7%, Nickel silicide: 14% | β | 2% | 2.3 | 10.8 | 50.7 | 535 | Printing cannot be performed due to clogging during applying of plate making | | |
| Comparative Example 2 | 1 | | β | 2% | 11.0 | 4.0 | 16.5 | 46.2 | 0.11 | 0.28 | 2.5 |
| Comparative Example 3 | 3 | SiC: 81%, Si: 10%, Nickel silicide: 9% | β | 3% | 18.1 | 2.4 | 13.3 | 32.9 | 0.13 | 0.36 | 2.8 |
| Comparative Example 4 | 3 | | β | 3% | 55.4 | 1.5 | 4.4 | 11.9 | 0.15 | 0.47 | 3.1 |

DESCRIPTION OF REFERENCE NUMERALS

100 Electrically heated honeycomb structure
110 Honeycomb structure portion
112 Outer peripheral side wall
114 First end face
116 Second end face
118 Partition wall
120 Electrode portion
122 Terminal connection portion

The invention claimed is:

1. A SiC powder comprising 70% by mass or more of a β-SiC, wherein in a volume-based cumulative particle size distribution measured by a laser diffraction method, a D50 is 8 to 35 μm and a D10 is 5 μm or more.

2. The SiC powder according to claim 1, wherein in the volume-based cumulative particle size distribution measured by the laser diffraction method, a cumulative volume of particles having a particle size of 5 μm or less is 7% or less.

3. The SiC powder according to claim 1, wherein in the volume-based cumulative particle size distribution measured by the laser diffraction method, the D50 is 15 to 35 μm, and the D10 is 7 to 20 μm.

4. The SiC powder according to claim 1, wherein in the volume-based cumulative particle size distribution measured by the laser diffraction method, a D90 is 100 μm or less.

5. The SiC powder according to claim 1, wherein a stacking fault of the β-SiC comprised in the powder is 5% or less.

6. The SiC powder according to claim 1, wherein a stacking fault of the β-SiC comprised in the powder is more than 2%.

7. The SiC powder according to claim 1, further comprising one or both of a metallic silicon and a silicide.

8. The SiC powder according to claim 1, comprising one or more third elements selected from a group consisting of Ni, Al, B, N, Ga, Ge, Ti, Cu, Co, P, Cr and Zr.

9. The SiC powder according to claim 8, wherein a total concentration of the third elements in the powder is 6% by mass or less.

10. A method for manufacturing the SiC powder according to claim 1, comprising:
 a step of preparing a formed body by forming a mixture comprising a SiC-forming raw material powder and a third element-containing powder;
 a step of obtaining a fired body comprising a β-SiC by firing the formed body under an inert atmosphere at a temperature of 1800° C. or lower;
 a step of obtaining a pulverized fired body by pulverizing the fired body; and
 a step of obtaining a powder having a D50 of 8 to 35 μm and a D10 of 5 μm or more in a volume-based cumulative particle size distribution measured by a laser diffraction method, by classifying the pulverized fired body.

11. The method for manufacturing the SiC powder according to claim 10, wherein in the volume-based cumulative particle size distribution measured by the laser diffraction method, the powder is such that a cumulative volume of particles having a particle size of 5 μm or less is 7% or less.

12. The method for manufacturing the SiC powder according to claim 10, wherein in the volume-based cumulative particle size distribution measured by the laser diffraction method, the powder has the D50 of 15 to 35 μm and the D10 of 7 to 20 μm.

13. The method for manufacturing the SiC powder according to claim 10, wherein in the volume-based cumulative particle size distribution measured by the laser diffraction method, the powder has a D90 of 100 μm or less.

14. The method for manufacturing the SiC powder according to claim 10, wherein the third element-containing powder comprises one or more third elements selected from a group consisting of Ni, Al, B, N, Ga, Ge, Ti, Cu, Co, P, Cr, and Zr.

15. The method for manufacturing the SiC powder according to claim 10, wherein a porosity of the fired body is 35 to 80%.

16. The method for manufacturing the SiC powder according to claim 10, wherein an average pore diameter of the fired body is 5 to 300 μm.

17. A method for manufacturing an electrically heated honeycomb structure, comprising:
 a step of obtaining a pillar-shaped honeycomb formed body, which comprises an outer peripheral side wall and partition walls disposed on an inner peripheral side of the outer peripheral side wall, the partition walls partitioning a plurality of cells extending from a first end face to a second end face and serving as a fluid flow path, by forming and drying a green body;

an electrode portion forming step of forming a pair of electrode portions by respectively applying an electrode portion forming paste to a first region and a second region of a side face of the honeycomb formed body or a honeycomb fired body obtained by firing the honeycomb formed body, and then drying and firing the applied electrode portion forming paste;

wherein one or both of the green body and the electrode portion forming paste comprise the SiC powder according to claim 1.

18. An electrically heated honeycomb structure manufactured by the method according to claim 17.

19. An electrically heated honeycomb structure comprising the SiC powder according to claim 1.

\* \* \* \* \*